US010138973B2

(12) United States Patent
Mihara

(10) Patent No.: US 10,138,973 B2
(45) Date of Patent: Nov. 27, 2018

(54) FLUID DAMPER DEVICE AND APPARATUS WITH DAMPER

(71) Applicant: NIDEC SANKYO CORPORATION, Nagano (JP)

(72) Inventor: Naoya Mihara, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/317,103

(22) PCT Filed: Jun. 4, 2015

(86) PCT No.: PCT/JP2015/066150
§ 371 (c)(1),
(2) Date: Dec. 7, 2016

(87) PCT Pub. No.: WO2015/190381
PCT Pub. Date: Dec. 17, 2015

(65) Prior Publication Data
US 2017/0114855 A1 Apr. 27, 2017

(30) Foreign Application Priority Data
Jun. 11, 2014 (JP) ................................. 2014-120295

(51) Int. Cl.
*F16D 57/00* (2006.01)
*F16F 9/14* (2006.01)
(Continued)

(52) U.S. Cl.
CPC .............. *F16F 9/145* (2013.01); *A47K 13/12* (2013.01); *E05F 5/02* (2013.01); *F16F 9/14* (2013.01);
(Continued)

(58) Field of Classification Search
CPC .......... A47K 13/10; A47K 13/12; F16F 9/145
(Continued)

(56) References Cited

U.S. PATENT DOCUMENTS 7,111,712 B2 * 9/2006 Orita ....................... F16F 9/145
188/290
7,798,296 B2 * 9/2010 Iwashita ................. F16F 9/145
188/290
(Continued)

FOREIGN PATENT DOCUMENTS

| CN | 2796632 | 7/2006 |
|---|---|---|
| JP | H05-010366 | 1/1993 |

(Continued)

OTHER PUBLICATIONS

"International Search Report (Form PCT/ISA/210) of PCT/JP2015/066150", dated Jul. 28, 2015, with English translation thereof, pp. 1-2.

(Continued)

*Primary Examiner* — Christopher P Schwartz
(74) *Attorney, Agent, or Firm* — JCIPRNET

(57) ABSTRACT

A fluid damper device and an apparatus with thereof are provided. In this fluid damper device, a protruded part of a valve body protrudes from a base part toward an outer side in the radial direction of the turning shaft, and toward one side around an axial line of the turning shaft, and a valve body support part of the turning shaft is equipped with a base part support part between a first protruded part and a second protruded part. An end part on an outer side in the radial direction of the first protruded part is provided with an inclined surface inclined with respect to an inner side portion of the valve body, and a space between the inner side portion and the end part increases from a second direction toward the first direction when the valve body is in the open position.

9 Claims, 7 Drawing Sheets

(51) Int. Cl.
*A47K 13/12* (2006.01)
*E05F 5/02* (2006.01)
*A47K 13/02* (2006.01)

(52) U.S. Cl.
CPC ......... *A47K 13/02* (2013.01); *E05Y 2900/614* (2013.01); *F16F 2232/02* (2013.01)

(58) Field of Classification Search
USPC ........................................ 188/290, 293, 296
See application file for complete search history.

(56) References Cited

U.S. PATENT DOCUMENTS

| | | | | |
|---|---|---|---|---|
| 8,167,100 | B2* | 5/2012 | Chen | A47K 13/12 188/290 |
| 9,492,041 | B1* | 11/2016 | Liang | A47K 13/12 |
| 2003/0126717 | A1* | 7/2003 | Iwashita | A47K 13/10 16/82 |
| 2003/0150678 | A1* | 8/2003 | Iwashita | A47K 13/12 188/296 |
| 2017/0130795 | A1* | 5/2017 | Mihara | F16F 9/145 |
| 2017/0314311 | A1* | 11/2017 | Mihara | A47K 13/12 |
| 2017/0314633 | A1* | 11/2017 | Mihara | E05F 3/20 |

FOREIGN PATENT DOCUMENTS

| | | |
|---|---|---|
| JP | H06-052695 | 7/1994 |
| JP | 2010151306 | 7/2010 |
| WO | 2013139150 | 9/2013 |

OTHER PUBLICATIONS

"Search Report of Europe Counterpart Application", dated Jan. 5, 2018, p. 1-p. 8.

* cited by examiner

FLUID DAMPER DEVICE AND APPARATUS WITH DAMPER

CROSS-REFERENCE TO RELATED APPLICATION

This application is a 371 of international application of PCT application serial no. PCT/JP2015/066150, filed on Jun. 4, 2015, which claims the priority benefits of Japan application no. JP 2014-120295, filed on Jun. 11, 2014. The entirety of each of the abovementioned patent applications is hereby incorporated by reference herein and made a part of this specification.

TECHNICAL FIELD

The present invention relates to a fluid damper device in which fluid is filled between a case and a rotor and an apparatus with a damper.

BACKGROUND ART

In a fluid damper device in which fluid is filled between a case and a rotor, a turning shaft of the rotor is disposed on an inner side of a case formed in a bottomed tube shape, and a valve body is disposed in the turning shaft. When the turning shaft is turned in a first direction and the valve body becomes a closing state, the fluid is going to be compressed and a load is applied to the turning shaft. On the other hand, when the turning shaft is reversed in a second direction and the valve body becomes an open state, the fluid goes through and a load is not applied to the turning shaft (see Patent Literature 1).

CITATION LIST

Patent Literature

[Patent Literature 1] Japanese Patent Laid-Open No. 2010-151306

SUMMARY

Technical Problem

In the fluid damper device described above, the present inventor has examined a structure that, as shown in FIG. 7, two protruded parts (first protruded part 461 and second protruded part 462) protruded to an outer side in a radial direction are provided in the turning shaft 40 and a base part 51 of a valve body 50 is supported between the first protruded part 461 and the second protruded part 462. The valve body 50 is provided with the base part 51 whose circumferential face in a circular arc-shaped cross section faces an inner side in the radial direction of the turning shaft 40, and a protruded part 52 which is protruded from the base part 51 to an outer side in the radial direction of the turning shaft 40 and toward one side (first direction "A") around an axial line of the turning shaft 40. Therefore, a base part support part 463 for supporting the base part 51 of the valve body 50 is formed between the first protruded part 461 and the second protruded part 462. According to this structure, when the turning shaft 40 is turned in the first direction "A" in an open state shown in FIG. 7, the valve body 50 is turned in a direction shown by the arrow "A0" with the base part 51 as a center and, as a result, the valve body 50 is brought into a closing state that the protruded part 52 is abutted with an inner peripheral face of the case 20. After that, when the turning shaft 40 is turned in the second direction "B", the valve body 50 is turned in a direction shown by the arrow "B0" with the base part 51 as a center and thus the valve body 50 is returned to an open attitude shown in FIG. 7.

However, in the structure shown in FIG. 7, the entire inner side portion 520 of the protruded part 52 facing an inner side in the radial direction of the turning shaft 40 is overlapped with an end part 465 on an outer side in the radial direction of the first protruded part 461 and thus, when viewed from the first direction "A" side, an area of the valve body exposed from the first protruded part 461 is narrow. Therefore, when the turning shaft 40 is turned in a closing direction (first direction "A"), fluid pressure applied to the valve body 50 is small and thus timing when the valve body 50 begins to turn in a direction shown by the arrow "A0" with the base part 51 as a center is easily delayed.

In view of the problem described above, an objective of the present invention is to provide a fluid damper device which is capable of smoothly shifting to a closing attitude of the valve body when the turning shaft is turned in a closing direction, and to provide an apparatus with a damper including the fluid damper device.

Solution to Problem

To solve the above-mentioned problem, the present invention provides a fluid damper device including a case in a tube shape, a rotor including a turning shaft structured to section a damper chamber between an inner peripheral face of the case and the turning shaft, and a valve body which is held by a valve body support part of the turning shaft, and fluid which is filled in the damper chamber. The valve body includes a base part provided with a circumferential face in a circular arc-shaped cross section which faces an inner side in a radial direction of the turning shaft, and a protruded part which is protruded from the base part toward an outer side in the radial direction of the turning shaft and toward one side around an axial line of the turning shaft. The valve body support part includes a first protruded part which is protruded to an outer side in the radial direction of the turning shaft toward the protruded part, a second protruded part which is protruded to an outer side in the radial direction of the turning shaft at a position adjacent to the first protruded part on the other side around the axial line of the turning shaft, and a base part support part which is opened toward an outer side in the radial direction of the turning shaft between the second protruded part and the first protruded part and, in which the base part is fitted in a turnable state around an axial line parallel to the axial line of the turning shaft. An end part on an outer side in the radial direction of the first protruded part is provided with an inclined face which is inclined with respect to an inner side portion of the protruded part facing an inner side in the radial direction of the turning shaft in a direction so that a space between the inner side portion and the inclined face is increased from the other side to the one side in a state that the valve body is most inclined to the one side with the base part as a center.

In the present invention, an end part of the first protruded part on an outer side in the radial direction is provided with an inclined face which is inclined with respect to an inner side portion of the valve body. A space between the inner side portion of the valve body and the end part (inclined face) of the first protruded part is increased from the other side toward the one side in an open attitude in which the valve body is most inclined to the one side by providing the inclined face. Therefore, when the valve body is viewed from the one side, an area of a portion of the valve body exposed from the first protruded part is large. Accordingly, when the turning shaft is turned in a closing direction (the one side), fluid pressure applied to the valve body is large and thus the valve body is smoothly shifted to a closing attitude with the base part as a center.

In the present invention, it is preferable that an angle between an imaginary straight line, which is directed from a center of the turning shaft to a contact position of an end on the other side of the inclined face with the inner side portion, and the inclined face is set to be not more than 90°. According to this structure, when the valve body is viewed from the one side, a projected area of the portion of the valve body exposed from the first protruded part is large. Therefore, when the turning shaft is turned in the closing direction (the one side), fluid pressure applied to the valve body is large and thus the valve body is smoothly shifted to the closing attitude with the base part as a center.

In the present invention, it is preferable that the angle between the imaginary straight line, which is directed from the center of the turning shaft to the contact position of the end on the other side of the inclined face with the inner side portion, and the inclined face is set to be not more than 60°. According to this structure, even in a case that the direction of the fluid pressure applied to the valve body is dispersed due to friction and the like between the fluid and the first protruded part, when the turning shaft is turned in the closing direction (the one side), the fluid pressure applied to the valve body is large. Therefore, the valve body is smoothly shifted to the closing attitude with the base part as a center.

In the present invention, it is preferable that the end part of the first protruded part is provided with a receiving face which receives the inner side portion on its surface between a position where an end on the other side of the inclined face is contacted with the inner side portion and the base part support part in the state that the valve body is most inclined to the one side with the base part as a center. According to this structure, when the valve body becomes an open attitude in which the valve body is most inclined to the one side with the base part as a center, the inner side portion of the valve body is supported by a surface of the receiving face. Therefore, in a case that the turning shaft is turned to the other side, even when the valve body receives fluid pressure, the valve body is hard to be turned with the contact position with the first protruded part as a supporting point. Accordingly, even when the rotor is turned in an open direction, floating of the valve body from the turning shaft can be restrained.

An apparatus with a damper including the fluid damper device in accordance with the present invention is structured so that a cover is attached to a device main body through the fluid damper device.

Advantageous Effects of Invention

In the present invention, an end part of the first protruded part on an outer side in the radial direction is provided with an inclined face which is inclined with respect to an inner side portion of the valve body, and a space between the inner side portion of the valve body and the end part (inclined face) of the first protruded part is increased from the other side toward the one side in an open attitude in which the valve body is most inclined to the one side by providing the inclined face. Therefore, when the valve body is viewed from the one side, an area of a portion of the valve body exposed from the first protruded part is large. Accordingly, when the turning shaft is turned in a closing direction (the one side), fluid pressure applied to the valve body is large and thus the valve body is smoothly shifted to a closing attitude with the base part as a center.

DESCRIPTION OF EMBODIMENTS

Embodiments to which the present invention is applied will be described below with reference to the accompanying drawings. In following descriptions, regarding a rotor 30, a direction in which a center axis of a turning shaft 40 is extended is referred to as an axial line "L" direction, a side where a case 20 is located in the axial line "L" direction is referred to as one side "L1", and an opposite side to the side where the case 20 is located (side where the turning shaft 40 is protruded) is referred to as the other side "L2".

First Embodiment (Entire Structure of Apparatus with Damper and Fluid Damper Device 10)

Figure 1:
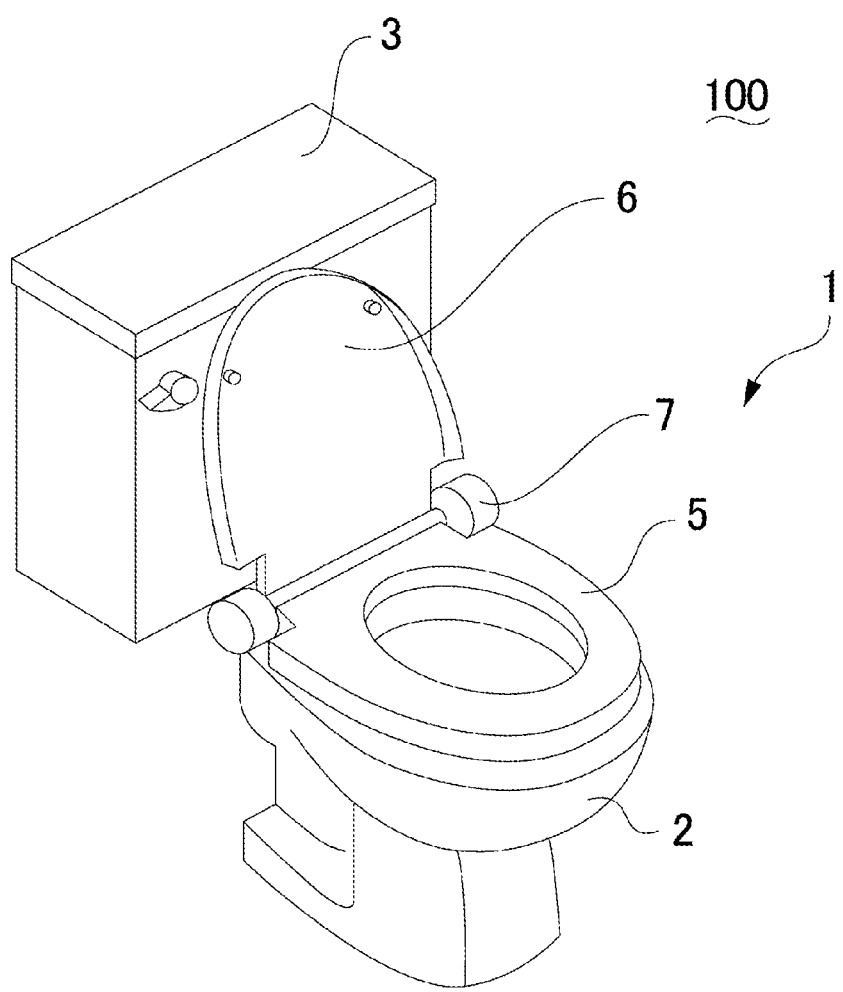
FIG. 1 is an explanatory view showing a Western-style toilet unit including a Western-style toilet bowl on which a fluid damper device in accordance with a first embodiment of the present invention is mounted.
Figure 2A:
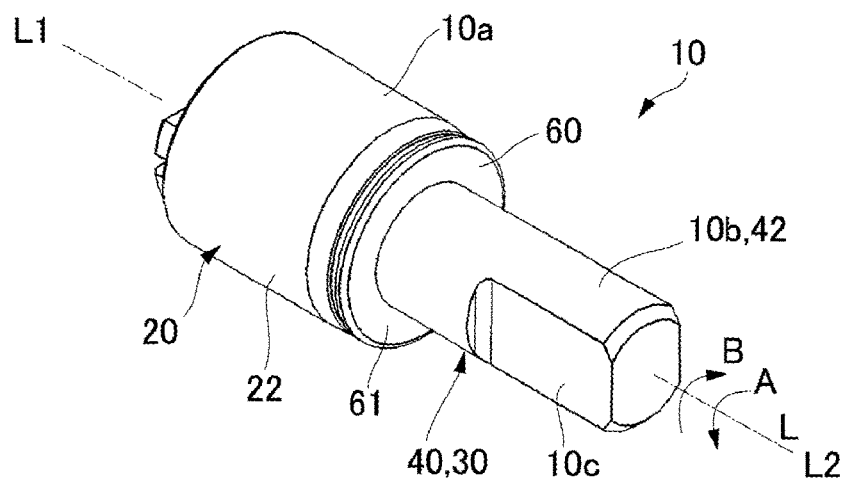
FIGS. 2(a) and 2(b) are perspective views showing a fluid damper device in accordance with a first embodiment of the present invention.
Figure 2B:
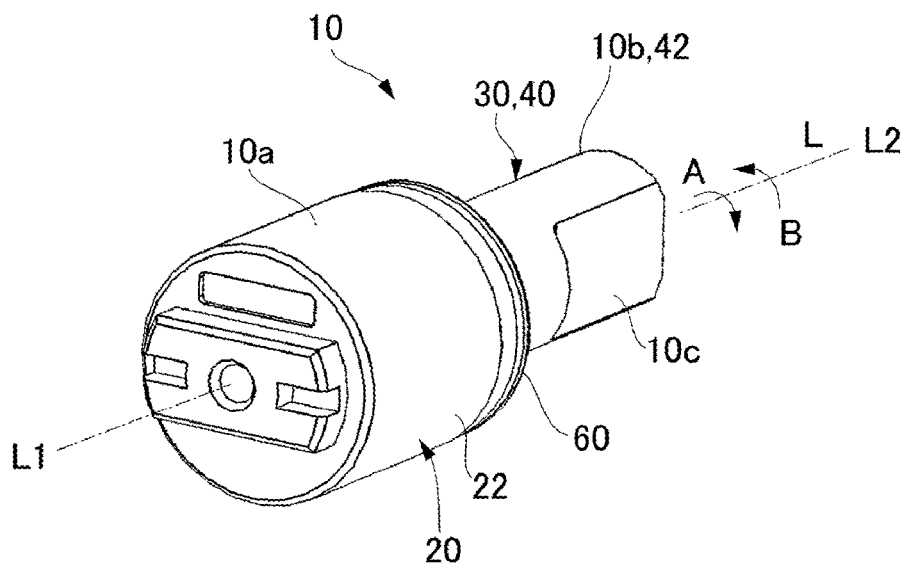

FIG. 1 is an explanatory view showing a Western-style toilet unit 100 including a Western-style toilet bowl 1 on which a fluid damper device 10 in accordance with a first embodiment of the present invention is mounted. FIGS. 2(a) and 2(b) are perspective views showing a fluid damper device 10 in accordance with a first embodiment of the present invention. FIG. 2(a) is a perspective view showing a fluid damper device 10 viewed from the other side "L2" in the axial line "L" direction, and FIG. 2(b) is a perspective view showing a fluid damper device 10 viewed from one side "L1" in the axial line "L" direction.

A Western-style toilet unit 100 shown in FIG. 1 includes a Western-style toilet bowl 1 (apparatus with a damper) and a water tank 3. The Western-style toilet bowl 1 includes a toilet bowl main body 2, a toilet seat 5 (cover member) made of resin, a toilet cover 6 (cover member) made of resin, a unit cover 7 and the like. Fluid damper devices for a toilet seat and a toilet cover described below are incorporated in an inside of the unit cover 7, and the toilet seat 5 and the toilet cover 6 are respectively connected with the toilet bowl main body 2 through the fluid damper device.

As shown in FIGS. 2(a) and 2(b), the fluid damper device 10 includes a fluid damper device main body 10a in a cylindrical columnar shape on one side "L1". A shaft-shaped connecting part 10b is protruded from the fluid damper device main body 10a to the other side "L2" and the connecting part 10b is connected with a toilet seat 5 or a toilet cover 6. When the toilet seat 5 and/or the toilet cover 6 in a stand-up state are going to fall down so as to cover the toilet bowl main body 2, the fluid damper device 10 generates resisting force (load) to reduce a falling-down speed of the toilet seat 5 or the toilet cover 6. In this case, the connecting part 10b is formed with two opposing faces in a flat face 10c, and the toilet seat 5 and toilet cover 6 are prevented from being idly turned with respect to the connecting part 10b by the flat faces 10c.

(Structure of Fluid Damper Device 10)

Figure 3A:
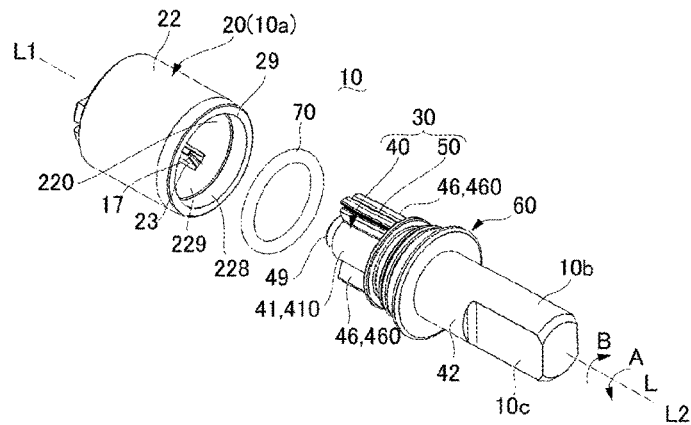
FIGS. 3(a), 3(b) and 3(c) are exploded perspective views showing a fluid damper device in accordance with a first embodiment of the present invention.
Figure 3B:
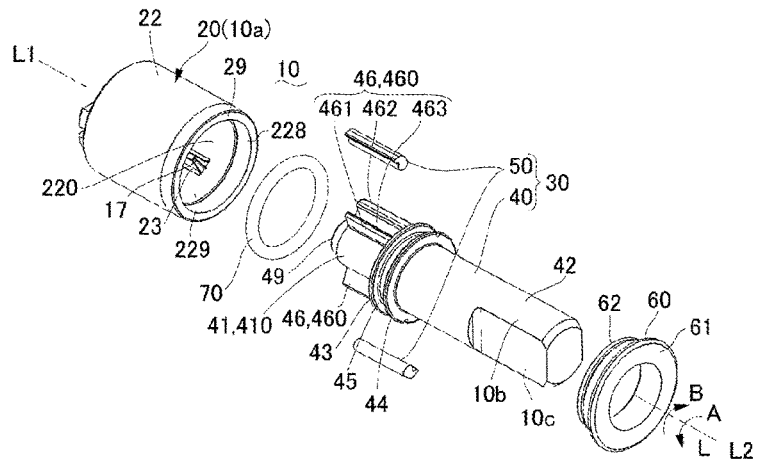
Figure 3C:
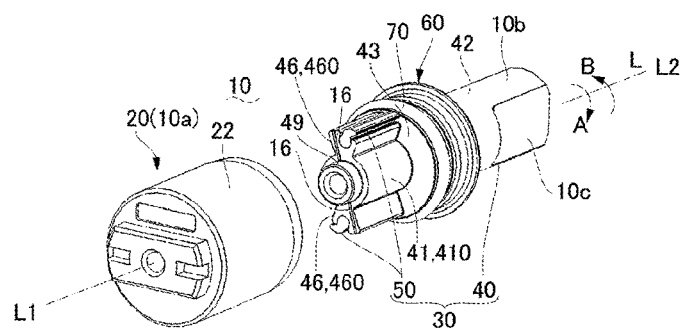
Figure 4A:
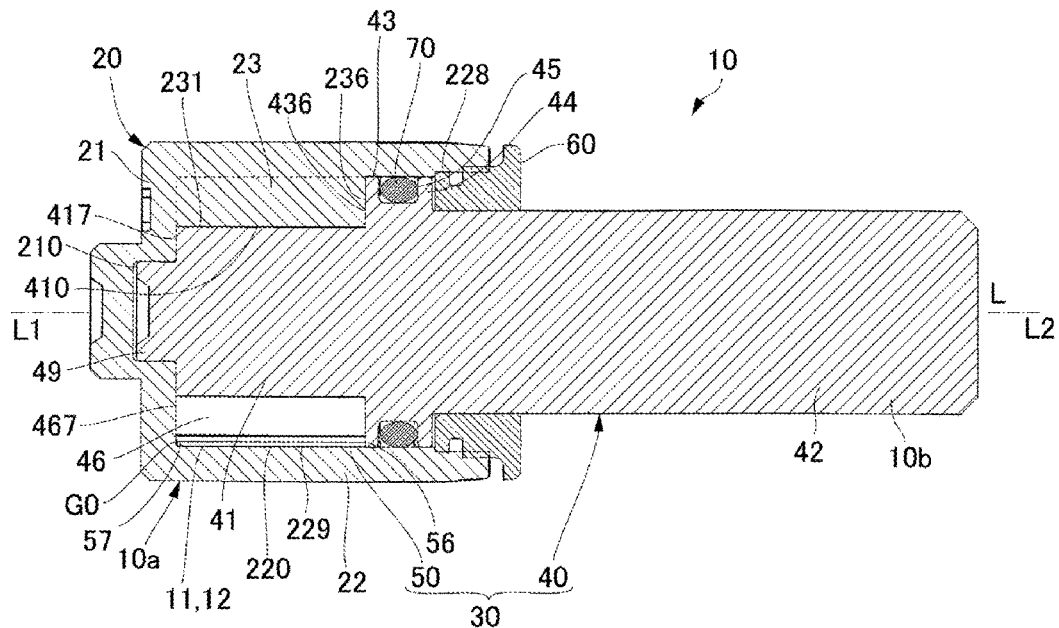
FIGS. 4(a) and 4(b) are cross-sectional views showing a fluid damper device in accordance with a first embodiment of the present invention.
Figure 4B:
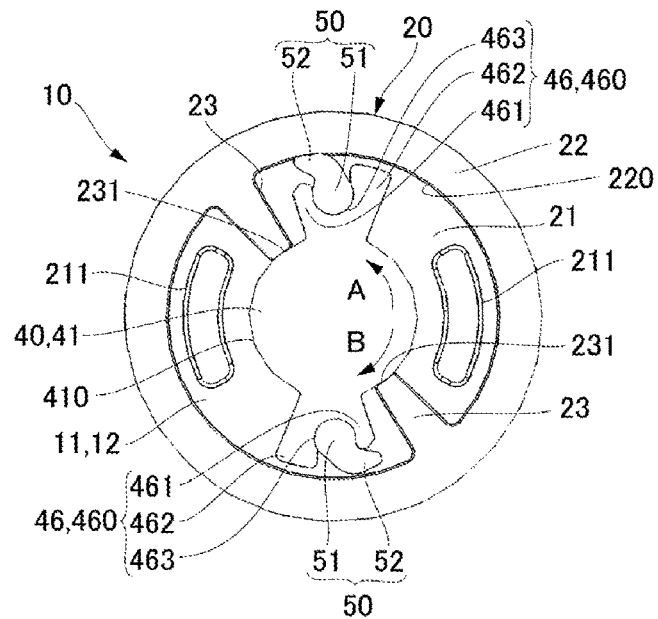
Figure 5A:
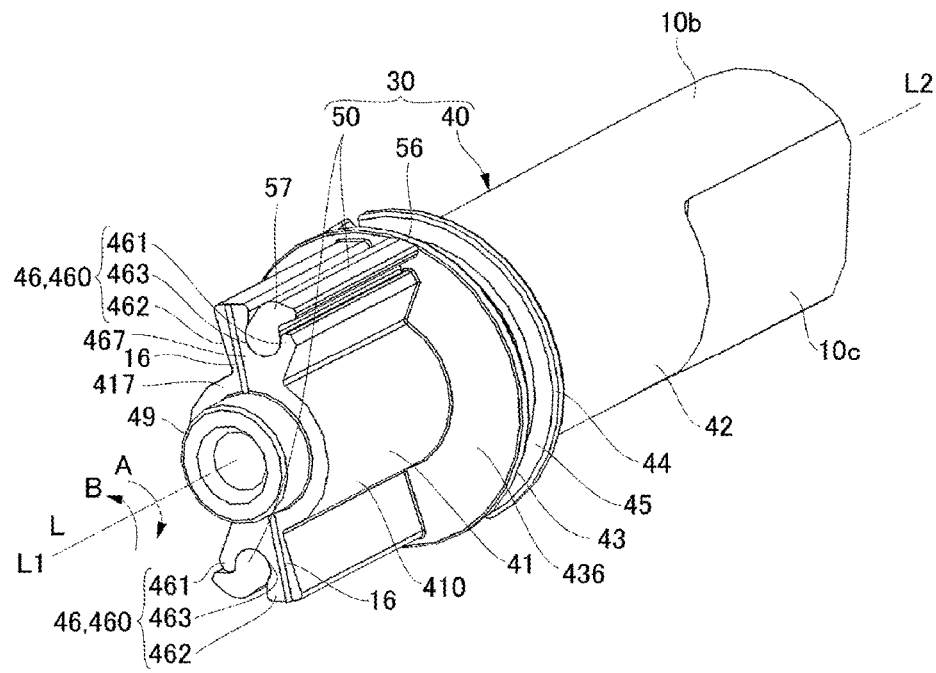
FIGS. 5(a) and 5(b) are explanatory views showing a part of a fluid damper device in accordance with a first embodiment of the present invention.
Figure 5B:
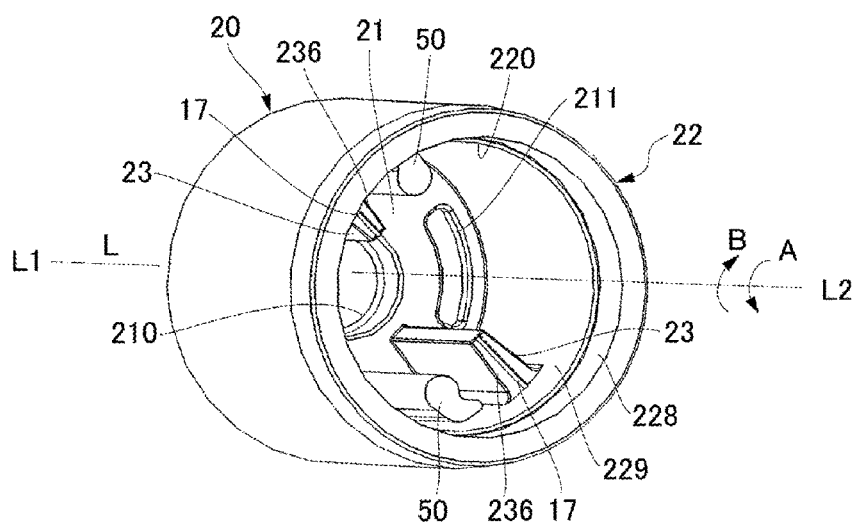

FIGS. 3(a), 3(b) and 3(c) are exploded perspective views showing the fluid damper device 10 in accordance with a first embodiment of the present invention. FIG. 3(a) is an exploded perspective view showing a state that a rotor 30 and the like are detached from a case 20 and viewed from the other side "L2" in the axial line "L" direction, FIG. 3(b) is an exploded perspective view showing a state that valve bodies 50 are detached from a turning shaft 40 of the rotor 30 and viewed from the other side "L2" in the axial line "L" direction, and FIG. 3(c) is an exploded perspective view showing a state that the rotor 30 and the like are detached from the case 20 and viewed from one side "L1" in the axial line "L" direction. FIGS. 4(a) and 4(b) are cross-sectional views showing the fluid damper device 10 in accordance with a first embodiment of the present invention. FIG. 4(a) is a cross-sectional view showing the fluid damper device 10 which is cut along the axial line "L" and FIG. 4(b) is a cross-sectional view showing a state that a damper chamber 11 of the fluid damper device 10 is cut in a direction perpendicular to the axial line "L" and viewed from the other side "L2" in the axial line "L" direction. FIGS. 5(a) and 5(b) are explanatory views showing a part of the fluid damper device 10 in accordance with a first embodiment of the present invention. FIG. 5(a) is a perspective view showing the rotor 30 which is viewed from one side "L1" in the axial line "L" direction and FIG. 5(b) is a perspective view showing the case 20 which is viewed from the other side "L2" in the axial line "L" direction. In FIG. 5(b), two valve bodies 50 are also shown.

As shown in FIGS. 3(a), 3(b) and 3(c) and FIGS. 4(a) and 4(b), the fluid damper device 10 includes a tube shaped case 20 provided with a bottom wall 21 on one side "L1", a rotor 30 whose portion on one side "L1" is disposed on an inner side of the case 20, and a ring-shaped cover 60 which closes an opening 29 of the case 20 on the other side "L2". The cover 60 is made of resin and is provided with a circular ring-shaped part 61 and a cylindrical tube part 62 which is protruded to one side "L1" from an inner side of the circular ring-shaped part 61.

In FIGS. 3(a), 3(b) and 3(c), FIGS. 4(a) and 4(b), and FIGS. 5(a) and 5(b), the case 20 is made of resin and is provided with a cylindrical tube-shaped body part 22 which is extended toward the other side "L2" from an outer circumferential edge of the bottom wall 21. An inner diameter of a portion 228 located on the other side "L2" of an inner peripheral face 220 of the body part 22 is set to be slightly larger than a portion 229 located on one side "L1".

A center of the bottom wall 21 of the case 20 is formed with a circular recessed part 210 which is recessed to one side "L1" and turnably supports an end part 49 on one side "L1" of the turning shaft 40 of the rotor 30, and two circular arc-shaped recessed parts 211 which are recessed to one side "L1" are formed on an outer side in a radial direction with respect to the recessed part 210. The two recessed parts 211 are formed at angular positions displaced from each other by 180° in a circumferential direction.

Two partitioning protruded parts 23 are protruded from the inner peripheral face 220 of the body part 22 to an inner side in a radial direction at positions displaced in a circumferential direction from each of two recessed parts 211. The two partitioning protruded parts 23 are formed at angular positions displaced from each other by 180° in the circumferential direction. In this embodiment, end parts on one side "L1" of both of the two partitioning protruded parts 23 are connected with the bottom wall 21. In this embodiment, the partitioning protruded part 23 is formed in a trapezoid shape cross section and its dimension in the circumferential direction (thickness) becomes thinner from an outer side toward an inner side in the radial direction.

The rotor 30 includes a turning shaft 40 whose one side "L1" in the axial line "L" direction is disposed on an inner side of the case 20 and valve bodies 50 held by the turning shaft 40. The turning shaft 40 is made of resin and is provided with a first shaft part 41 located on the inner side of the case 20 and a second shaft part 42 which is extended on the other side "L2" with respect to the first shaft part 41. An outer diameter of the first shaft part 41 is larger than that of the end part 49 on one side "L1" of the turning shaft 40, and an outer diameter of the second shaft part 42 is larger than that of the first shaft part 41. In this embodiment, the end part 49 is formed in a cylindrical tube shape for relaxing a shrinkage at the time of resin molding. In accordance with an embodiment of the present invention, an outer diameter of the second shaft part 42 may be smaller than that of the first shaft part 41.

The turning shaft 40 is formed with, between the first shaft part 41 and the second shaft part 42, a first flange part 43 in a circular shape which is adjacently disposed on the other side "L2" to the first shaft part 41 and a second flange part 44 in a circular shape which faces the first flange part 43 on the other side "L2" with a predetermined space therebetween. Therefore, a ring-shaped groove 45 is formed between the first flange part 43 and the second flange part 44. As a result, when an O-ring 70 is mounted on the groove 45 and then the first shaft part 41 of the turning shaft 40 is disposed on the inner side of the case 20, the O-ring 70 is abutted with the portion 229 located on one side "L1" of the inner peripheral face 220 of the body part 22 of the case 20 and a space sandwiched between the case 20 and the turning shaft 40 is sealed. Further, a space sectioned by the bottom wall 21 of the case 20 and the first flange part 43 of the first shaft part 41 facing the bottom wall 21 on the other side "L2" is sealed as a damper chamber 11. In this case, fluid 12 (viscous fluid) such as oil is filled in the damper chamber 11. After that, the cylindrical tube part 62 of the cover 60 is inserted between the second shaft part 42 of the turning shaft 40 and the body part 22 of the case 20 and the cover 60 is fixed by a method such as welding and, in this manner, the fluid damper device 10 is structured.

In this state, the end part 49 on one side "L1" of the turning shaft 40 is turnably supported by the recessed part 210 of the bottom wall 21 of the case 20 and the second shaft part 42 is turnably supported on an inner side of the cylindrical tube part 62 of the cover 60. Further, a part of the second shaft part 42 is penetrated through the cover 60 and the connecting part 10b is structured.

(Structure in Damper Chamber 11)

As shown in FIGS. 4(a) and 4(b) and FIGS. 5(a) and 5(b), in the damper chamber 11, inner side end parts 231 in a radial direction of two partitioning protruded parts 23 of the case 20 are contacted with an outer peripheral face 410 of the first shaft part 41 of the turning shaft 40.

Two valve body supporting protruded parts 46 are formed from an outer peripheral face 410 of the first shaft part 41 of the turning shaft 40 to an outer side in a radial direction at angular positions displaced by 180° in a circumferential direction, and a valve body 50 is supported in each of the two valve body supporting protruded parts 46. Each of the two valve body supporting protruded parts 46 is extended in the axial line "L" direction to the first flange part 43 with a portion located by a predetermined dimension on the other side "L2" from the end part 49 on one side "L1" of the turning shaft 40 as a starting point. An end part on the other side "L2" of each of the two valve body supporting protruded parts 46 is connected with the first flange part 43. In this embodiment, a width in the circumferential direction of the valve body supporting protruded part 46 is narrower on an inner side in the radial direction than its width on an outer side in the radial direction.

(Structure of Valve Body Support Part 460 and Valve Body 50)

Figure 6:
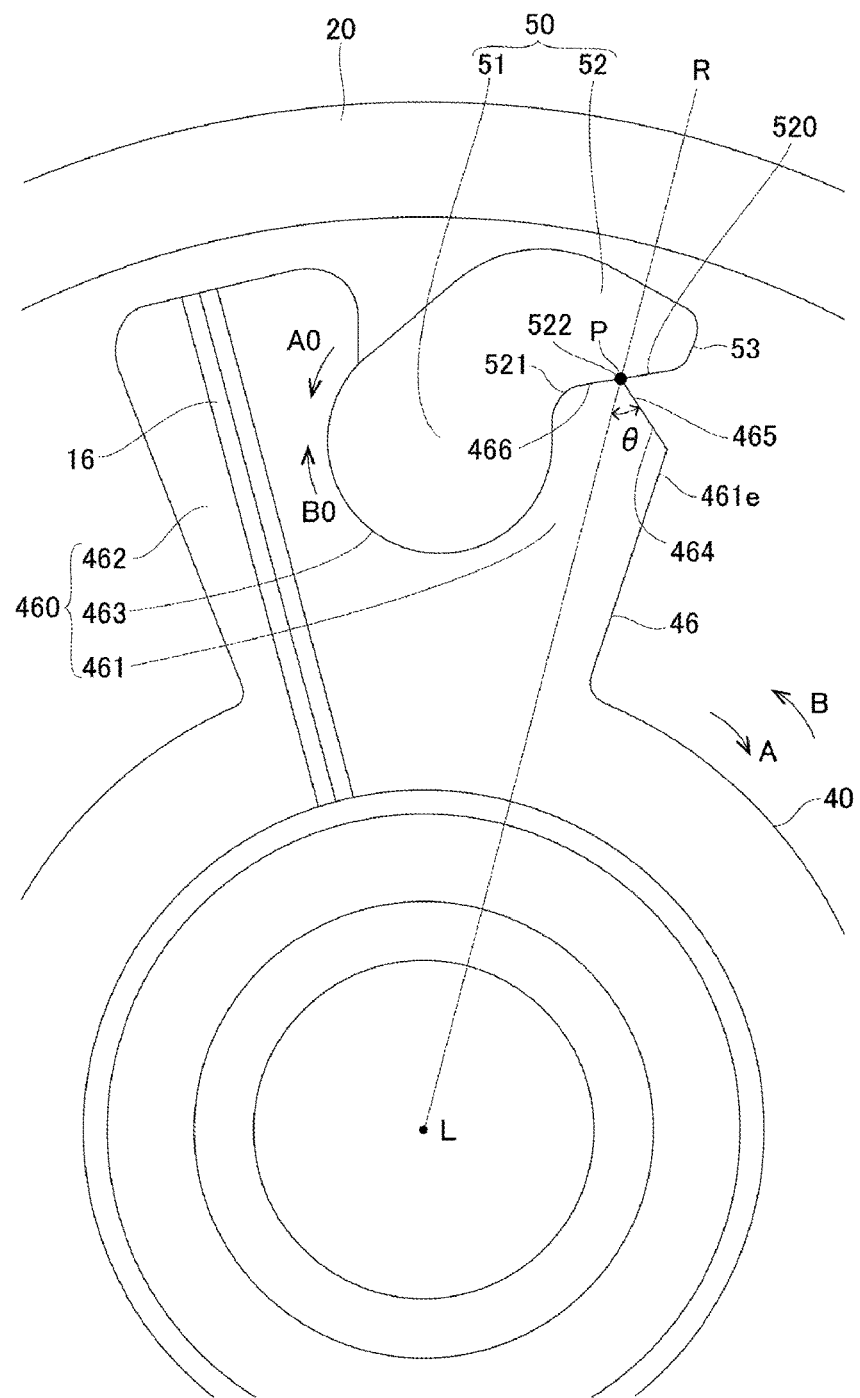
FIG. 6 is an explanatory enlarged view showing a valve body and a valve body support part of a fluid damper device in accordance with a first embodiment of the present invention.
Figure 7:
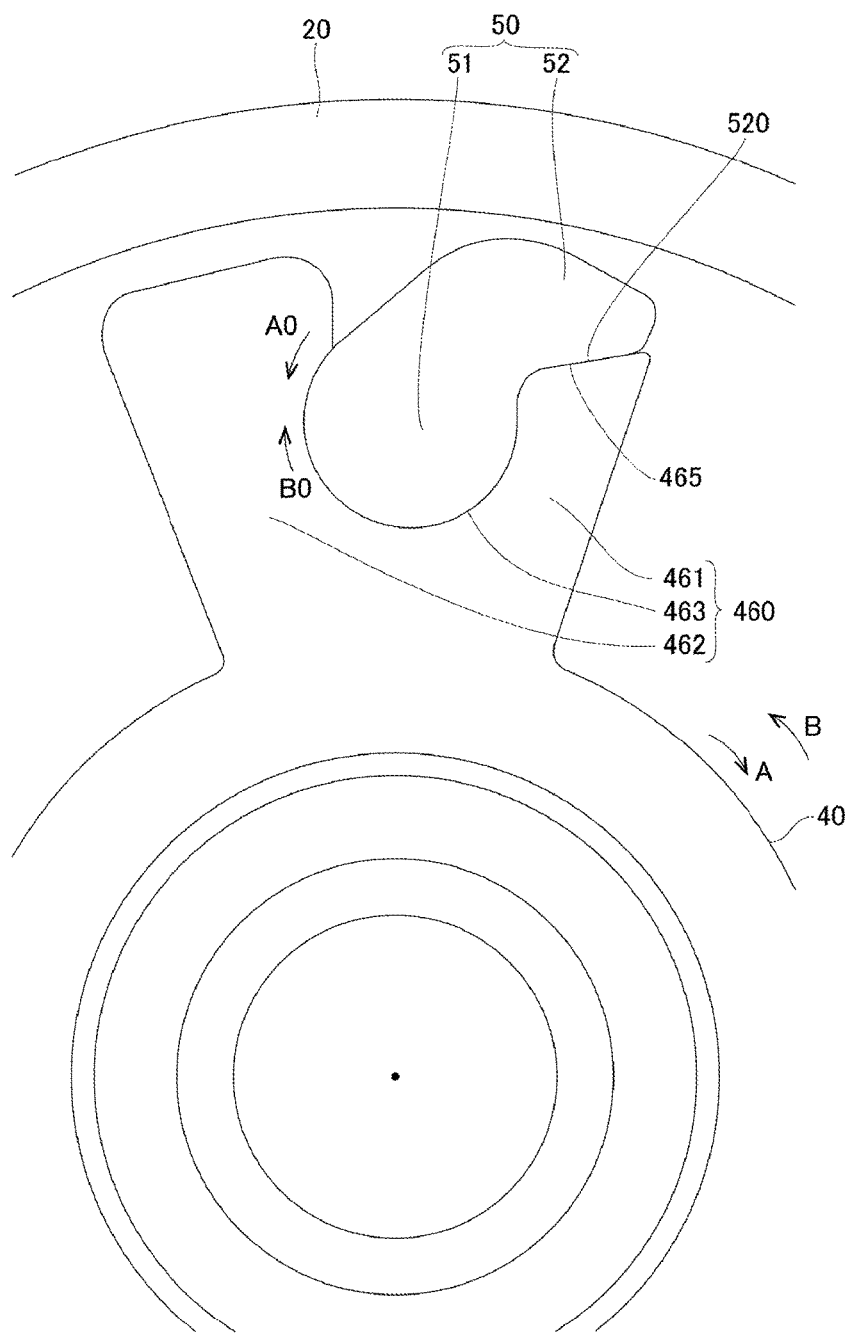
FIG. 7 is an explanatory enlarged view showing a valve body and a valve body support part of a fluid damper device in a comparison example.

FIG. 6 is an explanatory enlarged view showing the valve body 50 and the valve body support part 460 of the fluid damper device 10 in accordance with the first embodiment of the present invention. In FIG. 6, a state where the valve body 50 is in an open attitude is shown.

As shown in FIGS. 5(a) and 5(b) and FIG. 6, the valve body 50 is provided with a base part 51 whose circumferential face in a circular arc-shaped cross section faces an inner side in the radial direction of the turning shaft 40, and a protruded part 52 which is protruded from the base part 51 to an outer side in the radial direction of the turning shaft 40 and obliquely inclined toward one side (first direction "A") around the axial line "L" of the turning shaft 40. In this embodiment, the protruded part 52 is formed in a shape so as to protrude from a side of the base part 51 to an outer side in the radial direction and to be bent toward one side (first direction "A"). A thickness of the protruded part 52 becomes gradually thinner from a side of the base part 51 toward its tip end. Further, a tip end of the protruded part 52 is formed to be a tip end face 53 having a predetermined thickness in the radial direction of the turning shaft 40 and the tip end face 53 faces the circumferential direction. Further, the valve body 50 is formed so that an inner side portion 520 of the protruded part 52 facing an inner side in the radial direction of the turning shaft 40 is a continuous surface and, in this embodiment, the inner side portion 520 is formed in a continuous flat face. In accordance with an embodiment of the present invention, the protruded part 52 may be formed so that its tip end is provided with no face because its thickness is gradually reduced from a side of the base part 51 to its tip end, or may be formed in a shape so that its thickness is constant from a side of the base part 51 to its tip end.

On the other hand, a valve body support part 460 which supports the valve body 50 is formed in a portion on an outer side in the radial direction of the valve body supporting protruded part 46. In this embodiment, the valve body support part 460 is provided with a first protruded part 461 protruded to an outer side in the radial direction and a second protruded part 462 protruded to an outer side in the radial direction at a position adjacent to the first protruded part 461 on the other side around the axial line "L" (second direction "B"). The first protruded part 461 is protruded toward the protruded part 52 of the valve body 50. An end part on the other side "L2" of each of the first protruded part 461 and the second protruded part 462 is connected with the first flange part 43. Further, the valve body support part 460 is provided with a groove-shaped base part support part 463 which is opened toward an outer side in the radial direction between the first protruded part 461 and the second protruded part 462.

The base part support part 463 is formed in a circular arc shape whose inner peripheral face is curved over an angular range of about 180° or more. The base part 51 of the valve body 50 is turnably supported by the base part support part 463 around an axial line of the base part 51 (around an axial line parallel to the axial line "L"). In this embodiment, a width in the circumferential direction of the second protruded part 462 is wider than that of the first protruded part 461. Further, a tip end part of the first protruded part 461 is located on an inner side in the radial direction with respect to a tip end part of the second protruded part 462. Therefore, the protruded part 52 of the valve body 50 is located on an outer side in the radial direction of the first protruded part 461. Further, a width in the circumferential direction of the valve body supporting protruded part 46 is set to be narrower on an inner side in the radial direction with respect to an outer side in the radial direction.

An end part 465 on an outer side in the radial direction of the first protruded part 461 is provided with an inclined face 464 which is inclined with respect to the inner side portion 520 in a direction so that a space between the inner side portion 520 of the protruded part 52 and the inclined face 464 is increased from the other side (second direction "B") toward one side (first direction "A") in a state that the valve body 50 is most inclined to one side (first direction "A") with the base part 51 as a center. In this embodiment, an angle between an imaginary straight line "R", which directs from a center (axial line "L") of the turning shaft 40 toward a contact position "P" of an end on the other side (second direction "B") of the inclined face 464 with the inner side portion 520, and the inclined face 464 is set to be not more than 90°. The angle "θ" between an imaginary straight line "R", which directs from the center (axial line "L") of the turning shaft 40 toward the contact position "P" of an end on the other side (second direction "B") of the inclined face 464 with the inner side portion 520, and the inclined face 464 is preferably set not more than 60° and, in this embodiment, for example, set at 46°.

Further, in this embodiment, the end part 465 on an outer side in the radial direction of the first protruded part 461 is provided with a receiving face 466 for receiving the inner side portion 520 between the position (contact position "P") where an end on the other side (second direction "B") of the inclined face 464 is contacted with the inner side portion 520 and the base part support part 463 in an open attitude of the valve body 50 shown in FIG. 6. In other words, the end part 465 on an outer side in the radial direction of the first protruded part 461 is provided with the receiving face 466 which receives from a first portion 521 on the base part 51 side of the inner side portion 520 to a second portion 522 separated from the first portion 521 in a protruding direction of the protruded part 52 in the open attitude of the valve body 50 shown in FIG. 6. In this embodiment, the inner side portion 520 is formed in a continuous flat face and the receiving face 466 is also formed in a continuous flat face from a portion receiving the first portion 521 to a portion receiving the second portion 522. The inner side portion 520 may be formed in a curved face and, in this case, it is preferable that the receiving face 466 is also formed in a curved face in substantially the same shape as the inner side portion 520 from the portion receiving the first portion 521 to the portion receiving the second portion 522.

In the open attitude where the valve body 50 is inclined to one side in a circumferential direction (first direction "A") with the base part 51 as a center and is supported by the receiving face 466, the tip end face 53 of the valve body 50 is located slightly on the second direction "B" side with respect to a side face 461e in the first direction "A" of the first protruded part 461 and is not protruded to the first direction "A" side from the side face 461e in the first direction "A" of the first protruded part 461.

(Sealing Structure in Axial Line "L" Direction in Damper Chamber 11)

In FIGS. 3(a), 3(b) and 3(c), FIGS. 4(a) and 4(b) and FIGS. 5(a) and 5(b), the valve body 50 is, similarly to the valve body supporting protruded part 46, extended in the axial line "L" direction and an end part 56 on the other side "L2" of the valve body 50 is contacted with the first flange part 43. Therefore, there is almost no gap space between the valve body 50 and the first flange part 43. Accordingly, fluid 12 does not pass between the valve body 50 and the first flange part 43. On the other hand, an end part 57 on one side "L1" of the valve body 50 is located slightly on the other side "L2" with respect to an end part on one side "L1" of the valve body supporting protruded part 46. Therefore, a little gap space "G0" is secured on one side "L1" with respect to the valve body 50 between the valve body supporting protruded part 46 and the inner peripheral face 220 of the body part 22 of the case 20. Accordingly, a small amount of the fluid is capable of passing through the gap space "G0".

A small gap space is existed between the end face 417 on one side "L1" of the first shaft part 41 and the end part 467 on one side "L1" of the valve body supporting protruded part 46 and the bottom wall 21 of the case 20. However, a first rib (not shown in FIG. 4(a)) formed on the end face 417 on one side "L1" of the first shaft part 41 and the end part 467 on one side "L1" of the valve body supporting protruded part 46 is contacted with the bottom wall 21 of the case 20. Therefore, the fluid 12 does not pass between the end face 417 on one side "L1" of the first shaft part 41 and the bottom wall 21 and between the end face 467 on one side "L1" of the valve body supporting protruded part 46 and the bottom wall 21.

Specifically, the first rib 16 is abutted with the bottom wall 21 when the turning shaft 40 is disposed on an inner side of the case 20 for assembling the fluid damper device 10. Further, in a case that a height of the first rib 16 (protruding dimension) is too high, the first rib 16 is crushed between the bottom wall 21 and the end face 417 on one side "L1" of the first shaft part 41 and between the bottom wall 21 and the valve body supporting protruded part 46. In this embodiment, the first rib 16 is contacted with the base wall 21 in a crushed state.

A small gap space is existed between the end face 236 on the other side "L2" of the partitioning protruded part 23 and the first flange part 43 of the turning shaft 40 but a second rib (not shown in FIG. 4(a)) formed on the end face 236 on the other side "L2" of the partitioning protruded part 23 is contacted with the first flange part 43. Therefore, the fluid 12 does not pass through between the end face 236 on the other side "L2" of the partitioning protruded part 23 and the first flange part 43.

Specifically, when the turning shaft 40 is disposed on an inner side of the case 20 for assembling the fluid damper device 10, the second rib 17 is contacted with the first flange part 43. Further, in a case that a height of the second rib 17 (protruding dimension) is too high, the second rib 17 is crushed between the end part 236 on the other side "L2" of the partitioning protruded part 23 and the first flange part 43. In this embodiment, the second rib 17 is contacted with the first flange part 43 in a crushed state.

The first rib 16 and the second rib 17 are formed in a triangular-shaped cross section before crushed and a width of its root portion is wider than that of the tip end side in the protruding direction. Further, the first rib 16 and the second rib 17 are formed in a trapezoid-shaped cross section after crushed and, even after crushed, the width of the root portion is wider than that of the tip end side in the protruding direction.

As described above, in this embodiment, even when accuracy of the turning shaft 40 and the case 20 and assembling accuracy are not extremely high, in a case that the turning shaft 40 is turned in a direction for generating a load, the fluid can be easily restrained from being leaked from a gap space in the axial line "L" direction between the case 20 and the rotor 30. Accordingly, a sealed state in the damper chamber 11 is stabilized and thus time periods when the toilet seat 5 and the toilet cover 6 are fallen down can be stabilized. Further, the fluid 12 whose viscosity is low can be used as the fluid 12 and thus a load applied to the valve body 50 and the like can be reduced. Further, the fluid 12 whose viscosity is low is relatively inexpensive and thus cost of the fluid damper device 10 can be reduced.

(Operation)

In the fluid damper device 10 in this embodiment, when the rotor 30 (turning shaft 40) is turned in the first direction "A" around the axial line "L", the valve body 50 receives fluid pressure and turned in the direction shown by the arrow "A0" with the base part 51 as a center and the protruded part 52 is moved toward a side of the second protruded part 462. As a result, an outer side portion in the radial direction of the protruded part 52 is abutted with the inner peripheral face 220 of the body part 22 of the case 20. Therefore, in the valve body 50 and the valve body supporting protruded part 46, movement of the fluid in the second direction "B" is prevented and, as a result, a load (resistance force) is applied to the rotor 30 (turning shaft 40). Even in this case, a little gap space "G0" is existed between the valve body supporting protruded part 46 and the inner peripheral face 220 of the body part 22 of the case 20 on one side "L1" with respect to the valve body 50. Therefore, in the valve body 50 and the valve body supporting protruded part 46, movement of the fluid in the second direction "B" is permitted slightly. Accordingly, although a load is applied, the rotor 30 (turning shaft 40) is permitted to turn in the first direction "A" at a low speed.

On the other hand, when the rotor 30 (turning shaft 40) is turned in the second direction "B" around the axial line "L", the valve body 50 receives fluid pressure and is turned in a direction shown by the arrow "B0" with the base part 51 as a center and the protruded part 52 is moved toward a side of the first protruded part 461. As a result, a space is formed between an outer side portion in the radial direction of the protruded part 52 and the inner peripheral face of the body part 22 of the case 20. Therefore, in the valve body 50 and the valve body supporting protruded part 46, movement of the fluid in the first direction "A" is permitted and, as a result, a load is not applied to the rotor 30 (turning shaft 40).

In this embodiment, the partitioning protruded part 23 and the valve body supporting protruded part 46 are respectively provided at a plurality of positions (two positions) at equal angular intervals and with the same number in the circumferential direction. Therefore, the damper chamber 11 is divided into a plurality of portions (two chambers) and thus a large load can be generated. On the other hand, when the damper chamber 11 is divided, the number of a position where the fluid is going to leak from a gap space in the axial line direction between the case 20 and the rotor 30 is increased. However, according to this embodiment, the leakage can be restrained by the first rib 16 and the second rib 17 and thus a disadvantage of dividing the damper chamber 11 into a plurality of portions can be eliminated. Further, a width in the circumferential direction of the valve body supporting protruded part 46 is narrower on an inner side in the radial direction than an outer side in the radial direction. Therefore, the valve body supporting protruded part 46 is hard to be abutted with an inner side portion in the radial direction (root portion) of the partitioning protruded part 23 and thus a turnable angle of the rotor 30 can be widened.

(Principal Effects in this Embodiment)

As described above, in the fluid damper device 10 in this embodiment, the protruded part 52 of the valve body 50 is protruded from the base part 51 toward an outer side in the radial direction of the turning shaft 40 and toward one side (first direction "A") around the axial line "L" of the turning shaft 40, and the valve body support part 460 of the turning shaft 40 is provided with the base part support part 463 between the first protruded part 461 and the second protruded part 462. Therefore, accompanied with turning of the turning shaft 40, the valve body 50 is turned with the base part 461 as a center and an open attitude and a closing attitude are obtained.

Further, the end part 465 on an outer side in the radial direction of the first protruded part 461 of the turning shaft 40 is provided with the inclined face 464 which is inclined with respect to the inner side portion 520 of the valve body 50. A space between the inner side portion 520 of the valve body 50 and the end part 465 (inclined face 464) of the first protruded part 461 is increased from the other side (second direction "B") toward one side (first direction "A") by the inclined face 464 in an open attitude in which the valve body 50 is most inclined to one side (first direction "A"). Therefore, when the valve body 50 is viewed from the first direction "A" side, an area of the portion of the valve body 50 exposed from the first protruded part 461 is large. Therefore, when the turning shaft 40 is turned in a closing direction (first direction "A"), fluid pressure applied to the valve body 50 is large and thus the valve body 50 is smoothly moved to a closing attitude with the base part 51 as a center.

Especially, in this embodiment, an angle between the imaginary straight line "R" which is directed from the center of the turning shaft 40 (axial line "L") to the contact position "P" of the end on the other side (second direction "B") of the inclined face 464 with the inner side portion 520, and the inclined face 464 is set to be not more than 90°. Therefore, when the valve body 50 is viewed from the first direction "A" side, an projected area of the portion of the valve body 50 exposed from the first protruded part 461 is large. Accordingly, when the turning shaft 40 is turned in a closing direction (first direction "A"), fluid pressure applied to the valve body 50 is large and thus the valve body 50 is smoothly shifted to a closing attitude with the base part 51 as a center.

Further, in this embodiment, the angle between the imaginary straight line "R" and the inclined face 464 is set to be not more than 60°, even in a case that the direction of the fluid pressure applied to the valve body 50 is dispersed due to friction and the like between the fluid and the first protruded part 461, when the turning shaft 40 is turned in a closing direction (first direction "A"), the fluid pressure applied to the valve body 50 is large. Therefore, the valve body 50 is smoothly shifted to a closing attitude with the base part 51 as a center.

Further, the inner side portion 520 of the protruded part 52 of the valve body 50 is supported by the receiving face 466 of the first protruded part 461 from the first portion 521 to the second portion 522. Therefore, in a case that the turning shaft 40 is turned in an open direction (second direction "B"), even when the valve body 50 receives fluid pressure in the first direction "A", the valve body 50 is hard to be turned with the contact position with the first protruded part 461 as a supporting point. Accordingly, even when the rotor 30 is turned in an open direction, floating of the valve body 50 from the turning shaft 40 can be restrained.

The invention claimed is:

1. A fluid damper device comprising:
   a case in a tube shape;
   a rotor comprising a turning shaft structured to section a damper chamber between an inner peripheral face of the case and the turning shaft, and a valve body which is held by a valve body support part of the turning shaft; and
   fluid which is filled in the damper chamber;
   wherein the valve body comprises:
      a base part provided with a circumferential face in a circular arc-shaped cross section which faces an inner side in a radial direction of the turning shaft; and
      a protruded part which is protruded from the base part toward an outer side in the radial direction of the turning shaft and toward one side around an axial line of the turning shaft;
   wherein the valve body support part comprises:
      a first protruded part which is protruded to an outer side in the radial direction of the turning shaft toward the protruded part;
      a second protruded part which is protruded to an outer side in the radial direction of the turning shaft at a position adjacent to the first protruded part on the other side around the axial line of the turning shaft; and
      a base part support part which is opened toward an outer side in the radial direction of the turning shaft between the second protruded part and the first protruded part and in which the base part is fitted in a turnable state around an axial line parallel to the axial line of the turning shaft; and
   wherein an end part on an outer side in the radial direction of the first protruded part is provided with an inclined face which is inclined with respect to an inner side portion of the protruded part facing an inner side in the radial direction of the turning shaft in a direction so that a space between the inner side portion and the inclined face is increased from the other side to the one side in a state that the valve body is most inclined to the one side with the base part as a center,
   wherein an angle between an imaginary straight line, which is directed from a center of the turning shaft to a contact position of an end on the other side of the inclined face with the inner side portion, and the inclined face is set to be not more than 60°,
   wherein the end part of the first protruded part is provided with a receiving face which receives the inner side portion on its surface between a position where an end on the other side of the inclined face is contacted with the inner side portion and the base part support part in the state that the valve body is most inclined to the one side with the base part as a center, and when the turning shaft is turned in a closing direction in the state that the valve body is most inclined to the one side with the base part as a center, a fluid pressure in which the fluid is directed toward the outer side in the radial direction by the inclined face is applied to the protruded part of the valve body.

2. The fluid damper device according to claim 1, wherein the inclined face of the first protruded part is formed from an inner side in the radial direction of the turning shaft toward an outer side in the radial direction as going from the one side to the other side, and when the turning shaft is turned from the other side to the one side, the fluid is directed toward the outer side in the radial direction of the turning shaft along the inclined face.

3. The fluid damper device according to claim 2, wherein the case comprises a bottom wall and a cylindrical tube shaped body part which is extended in an axial line direction of the turning shaft from an outer circumferential edge of the bottom wall, an end part on a bottom wall side of the second protruded part of the valve body support part is formed with a rib for preventing the fluid from passing between the end part of the second protruded part and the bottom wall, and when the turning shaft is disposed on an inner side of the case, the rib is contacted with the bottom wall in a crushed state.

4. The fluid damper device according to claim 2, wherein the case comprises a bottom wall and a body part which is formed in a cylindrical tube shape and is extended in an axial line direction of the turning shaft from an outer circumferential edge of the bottom wall, two partitioning protruded parts are formed so as to protrude from an inner peripheral face of the body part toward an inner side in the radial direction at angular positions displaced from each other by 180° in a circumferential direction and thereby two damper chambers are formed between the turning shaft and the inner peripheral face of the body part, the valve body support part is formed from an outer peripheral face of the turning shaft toward an outer side in the radial direction at two angular positions displaced from each other by 180° in the circumferential direction, each of the two valve body support parts is disposed in each of two damper chambers, and a width in the circumferential direction of the valve body support part is narrower on an inner side in the radial direction with respect to an outer side in the radial direction.

5. An apparatus with a damper, comprising:
a fluid damper device; and
a cover body which is attached to a device main body through the fluid damper device;
wherein the fluid damper device comprising:
 a case in a tube shape;
 a rotor comprising a turning shaft structured to section a damper chamber between an inner peripheral face of the case and the turning shaft, and a valve body which is held by a valve body support part of the turning shaft; and
 fluid which is filled in the damper chamber;

wherein the valve body comprises:
 a base part provided with a circumferential face in a circular arc-shaped cross section which faces an inner side in a radial direction of the turning shaft; and
 a protruded part which is protruded from the base part toward an outer side in the radial direction of the turning shaft and toward one side around an axial line of the turning shaft;
wherein the valve body support part comprises:
 a first protruded part which is protruded to an outer side in the radial direction of the turning shaft toward the protruded part;
 a second protruded part which is protruded to an outer side in the radial direction of the turning shaft at a position adjacent to the first protruded part on the other side around the axial line of the turning shaft; and
 a base part support part which is opened toward an outer side in the radial direction of the turning shaft between the second protruded part and the first protruded part and in which the base part is fitted in a turnable state around an axial line parallel to the axial line of the turning shaft;
wherein an end part on an outer side in the radial direction of the first protruded part is provided with an inclined face which is inclined with respect to an inner side portion of the protruded part facing an inner side in the radial direction of the turning shaft in a direction so that a space between the inner side portion and the inclined face is increased from the other side to the one side in a state that the valve body is most inclined to the one side with the base part as a center,
wherein an angle between an imaginary straight line, which is directed from a center of the turning shaft to a contact position of an end on the other side of the inclined face with the inner side portion, and the inclined face is set to be not more than 60°,
wherein the end part of the first protruded part is provided with a receiving face which receives the inner side portion on its surface between a position where an end on the other side of the inclined face is contacted with the inner side portion and the base part support part in the state that the valve body is most inclined to the one side with the base part as a center, and
wherein when the turning shaft is turned from the other side to the one side, the protruded part of the valve body receives fluid pressure of the fluid and is abutted with the inner peripheral face of the case to apply a load to movement of the cover body through the turning shaft.

6. The apparatus with a damper according to claim 5, wherein
the inclined face of the first protruded part is formed from an inner side in the radial direction of the turning shaft toward an outer side in the radial direction as going from the one side to the other side, and
when the turning shaft is turned from the other side to the one side, the fluid is directed toward the outer side in the radial direction of the turning shaft along the inclined face.

7. The apparatus with a damper according to claim 6, wherein
the case comprises a bottom wall and a cylindrical tube shaped body part which is extended in an axial line direction of the turning shaft from an outer circumferential edge of the bottom wall, an end part on a bottom wall side of the second protruded part of the valve body support part is formed with a rib for preventing the fluid from passing between the end part of the second protruded part and the bottom wall, and when the turning shaft is disposed on an inner side of the case, the rib is contacted with the bottom wall in a crushed state.

8. The apparatus with a damper according to claim 6, wherein the case comprises a bottom wall and a body part which is formed in a cylindrical tube shape and is extended in an axial line direction of the turning shaft from an outer circumferential edge of the bottom wall, two partitioning protruded parts are formed so as to protrude from an inner peripheral face of the body part toward an inner side in the radial direction at angular positions displaced from each other by 180° in a circumferential direction and thereby two damper chambers are formed between the turning shaft and the inner peripheral face of the body part, the valve body support part is formed from an outer peripheral face of the turning shaft toward an outer side in the radial direction at two angular positions displaced from each other by 180° in the circumferential direction, each of the two valve body support parts is disposed in each of two damper chambers, and a width in the circumferential direction of the valve body support part is narrower on an inner side in the radial direction with respect to an outer side in the radial direction.

9. The apparatus with a damper according to claim 6, wherein the apparatus with a damper is a Western-style toilet bowl, and a toilet seat and a toilet cover as the cover body are respectively connected with a toilet bowl main body as the device main body through the fluid damper device.

* * * * *